United States Patent
Collins, Sr.

[15] 3,674,905
[45] July 4, 1972

[54] TEACHING AID
[72] Inventor: James W. Collins, Sr., 400 N.W. Fifth Street, Mineral Wells, Tex. 76007
[22] Filed: April 22, 1970
[21] Appl. No.: 30,659

[52] U.S. Cl. .................................................35/35 G, 35/77
[51] Int. Cl. .....................................................G09b 19/00
[58] Field of Search .................35/35 G, 35 H, 35 J, 71, 77; 40/68 X

[56] References Cited

UNITED STATES PATENTS 1,732,980  10/1929  Mooney ............................35/35 J X

FOREIGN PATENTS OR APPLICATIONS 899,474  8/1944  France ................................35/35 G
834,452  3/1952  Germany ............................35/35 G
1,170,908  9/1958  France ................................35/35 G

*Primary Examiner*—Robert W. Michell
*Assistant Examiner*—J. H. Wolff
*Attorney*—Clarence A. O'Brien and Harvey B. Jacobson

[57] ABSTRACT

A windowed housing internally supports a removable rod that mounts a series of concentrically positioned wheels having indicia thereon which appear through the windows. Detent means between the wheels and the housing permit the selective positioning of the wheels such that particular indicia remain in view through the windows. Brackets are provided in the interior of the housing to slidably mount the rod thereby permitting rapid removal and replacement of the rod. Removal of the rod allows rapid rearrangement of the wheel order on the rod.

6 Claims, 5 Drawing Figures

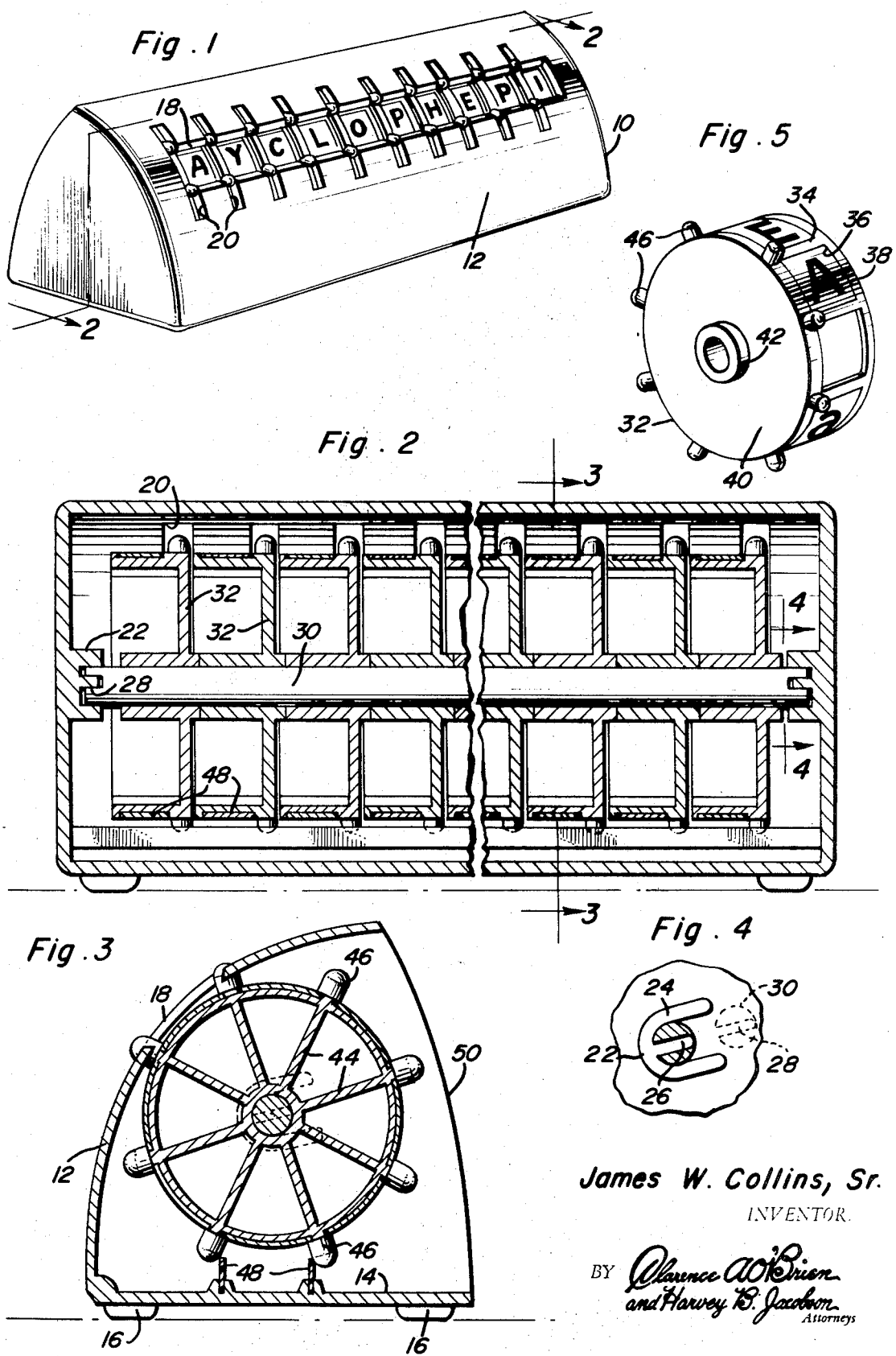

TEACHING AID

The present invention relates to teaching aids and more particularly to a teaching aid for the letters of the alphabet and the sounds for which the various letter combinations stand.

Conventional techniques for teaching the concept of the alphabet and word grouping usually includes the utilization of blackboards, or cards having fixed word groupings thereon. With such apparatus, it is time consuming to change the order of letters which is required to teach the learner new and different sounds in the form of multiple letter words.

By virtue of the present invention, combinations of letters may be rapidly changed so that the learner's interest is maintained. The particular advantage of the present invention resides in the fact that the learner is able to get the general pattern of pronunciation, an over-view, as it were, that is not possible using lists, cards, diagrams, chalkboard illustrations, pencil and paper, or any of the traditional methods including phonic workbooks.

The present teaching aid is simply and economically constructed. The device is easy to use and can withstand the physical punishment of young children due to its rugged mechanism. The housing of the aid is smoothly contoured so that it is safe for use by children.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the present teaching aid.

FIG. 2 is a longitudinal sectional view taken along a plane passing through section line 2—2 of FIG. 1.

FIG. 3 is a transverse sectional view taken along a plane passing through section line 3—3 of FIG. 2.

FIG. 4 is a detail view of a bracket taken along a plane passing through section line 4—4 of FIG. 2.

FIG. 5 is a perspective view of a typical indicia bearing wheel as employed in the present invention.

Referring to the drawings the present invention is seen to include an elongated shell-like housing 10 having a front arcuate side 12 articulating to a rectangular base 14 supported on leg members 16. A series of ten horizontally disposed adjacent slots or windows 18 are formed in the front side 12, the windows serving as viewing ports for indicia. Lateral slots 20 extend from opposite sides of each window to permit the passage of elements projecting from internal components as hereinafter explained.

Referring to FIGS. 2–4, bosses 22 extend horizontally inwardly from the interior of the transverse housing walls. These bosses serve as brackets for mounting a horizontally disposed rod 30. As will be more clearly shown in FIG. 4, the boss bracket may be characterized by a raised W-shaped configuration having outer arms 24 which embrace the circumference of an associated rod end. The central arm 26 serves as a guide for insertion within a slot 28 formed in each end of the rod 30. As will be noted, the slotted rod 30 resembles the building rods utilized in the well-known "Tinker Toy". The back of the housing 10 is open so that the rod slides into engagement with the bracket 22. This type of bracket mounting allows the rod to be easily inserted and removed from the housing.

Referring to FIGS. 2, 3 and 5, the rod 30 serves as an axle mount for a plurality of concentrically spaced indicia bearing wheels 32. As shown in FIG. 5, each wheel includes a cylindrical surface 34 having the pressed frame recesses 36 formed therein. Each frame in the preferred embodiment of the present invention includes an alphabetical letter 38. One end of the cylindrical surface 34 appends to a centrally bored circular side 40 having a boss 42 extending outwardly therefrom, the boss being slipped over the mounting rod 30. The other end of the wheel is opened and as will be seen in FIGS. 2 and 3, reinforcing ribs 44 extend outwardly from the inside of the circular wheel side 40.

In a preferred embodiment of the present invention, ten windows 18 (FIG. 1) are formed in the housing and are associated with ten adjacently positioned indicia bearing wheels 32. In accordance with the teaching method set forth hereinafter, the wheels, not the indicia thereon are color-coded and divided into color groups as follows: three of the wheels are colored red and bear vowels; one wheel is colored yellow and bears silent consonants; one wheel is colored green and bears digraphs and blends; further, three dark blue wheels contain all 21 consonant letters and two light blue wheels bear 14 consonants most often used as initial or terminal letters in syllables. As will be noted from the figures, each wheel includes eight frames for carrying up to eight alphabetical characters.

Except for the three red wheels bearing vowels, each wheel has seven letters plus a blank space. The three red wheels have the vowels A, E, I, O, U, Y as well as the schwa (ə). The schwa is the inverted small e used for designating unaccented vowels.

In order to allow manipulation of the wheels so that the alphabetical characters may be changed with respect to their position in front of a window 18, projecting elements 46 extend radially outward from one end of the cylindrical surface 34. When the wheels are properly mounted on rod 30, these projecting elements pass through the elongated slots 20 which have been formed in the housing so that the housing does not interfere with rotation of the wheels.

In order to retain the wheels in preselected positions, a pair of adjacently spaced flexible strips 48 are anchored within the base 14 of the housing and extend upward to engage the bottom projections 46 as seen in FIG. 3. Thus, in effect, the engagement between the bottom projections 46 and the strips 48 are seen to effect detent action. Of course, when some force is applied to rotate the wheel, the detent action is defeated thereby allowing rotation of the wheels.

In operation of the device, the wheels are arranged on rod 30 in a manner permitting the formation of sound blends which are viewable through the windows 18 in the housing 10. The general approach for teaching word construction to the learner is as follows:

It is easier to start with long vowel sounds first. Explain to the learner that a long vowel sound can be distinguished by listening for the sound of one of the letters A, E, I, O or U. That is, "A" can be heard in "ATE", "E" in "EAT," "I" in "ICE," in "OAT," "U" in "USE," etc. With young children, it is often necessary to go over this several times so that they know what they are listening for.

It is advantageous to point out early that you can't have a syllable without a vowel (red wheel).

Assuming that you choose to start teaching long vowel sounds first, you may begin by putting on the far right of the rod, a red wheel with "E" in view of the slot. Just to the left of "E," place a light blue wheel with "B" in view. To its left place another red wheel showing "A". Explain that the final "E" makes no sound, but causes the other vowel to be long. You have "A B E" in view. Now advance the consonant wheel to "D," "F," "G," "L" . . . explaining that the sound of "A" can be heard in all these syllables. (You may skip "G" in this series and cover it on the green wheel, since in this pattern it has the sound equivalent of "J.")

Stress the sound of the vowel remaining long. There are certainly exceptions, but they usually occur in common words and can be learned individually easily enough, i.e. "H A V E." To develop word attack ability, the learner must know the general pattern.

Next, you should go on to the other vowel letters "E," "I," "O," "U," and perhaps, "Y," depending on the learner involved. If here, then it has the sound equivalent of the long "I," of course. Before going to a new vowel letter, go through all of the consonants. By this time, the learner should know what is meant by a long vowel sound. There are several other combinations that make long vowels, but they can be taught more easily later. Now you are ready to either go on to short vowel sounds, or to begin making one-syllable words and non-sense syllables.

If you choose to start making words and nonsense syllables, simply put on another blue wheel to the left of those already on. A dark blue wheel is all right here. Now you have "B A B E," "C A B E," "D A B E," "F A B E" . . . Then, "B A D E," "C A D E," "D A D E," "F A D E" . . . When you have gone through all the consonants on the light blue wheels (position next to final "E"), advance to the next vowel "E," and go completely through this cycle: "B E B E," "B E D E," "B E F E," "B E L E:" then, "B I B E," "B I D E," "B I F E," etc.

By this time, you should be ready to begin on short vowels. Go back to two wheels by simply turning the final "E" and initial consonant, to the blank position on the wheel. Now you are ready to start with "A B," "A D," "A F" . . . Then, "E B," "E D," "E F" . . . After all the vowels have been sounded through in this manner, again go through the cycle with the consonant wheel on the left: "B A B," "C A B," "D A B," "F A B" . . . Then, "B E B," "C E B," "D E B" . . . After going through all the vowels in this fashion, you are ready to go on to blends, silent letters and other combinations for long vowels, other vowel sounds ("OO," "OW," "OU," "AU," "AW"), but by this time the learners are reading on their own and liking it.

The last symbol on the vowel wheel is for unaccented vowels. This should be used to show the sound is the same no matter what letter the word is actually spelled with in the unstressed syllable.

Example:  A                    E                    I
C A L E N D A R.  O T H E R.  P E N C I L.
          O  ə                 U  ə                    ə
C O L  R.   C I R C  S.
       ə           ə

The yellow wheel for silent letters should not be introduced until the learner is able to readily determine the vowel sound (long or short) in combinations like: "E N T," "N E E," "N A T," "O U R," "N U," "R A P." Then: "S C E N T," "K N E E," "G N A T," "H O U R," "P N E U M A T I C," "W R A P."

| Vowels Wheels 1, 2, 3 | | | Silent Consonants | | Consonant Letters with sound equivalent of other consonant letters and digraphs | |
|---|---|---|---|---|---|---|
| RED | | | YELLOW | | GREEN | |
| W1 | W2 | W3 | W4 | Also | W5 | Also |
| A | A | A | C | B | CH | C |
| E | E | E | G | L | NG | G |
| I | I | I | H | N | PH | S |
| O | O | O | K |   | QU | X |
| U | U | U | M |   | SH |   |
| Y | Y | Y | P |   | TH |   |
| ə | ə | ə | W |   | WH |   |
| " | " | "(Blank) | " | "(Blank) | "(Blank) |   |

| DARK BLUE | | | LIGHT BLUE | |
|---|---|---|---|---|
| W6 | W7 | W8 | W9 | W10 |
| B | K | S | B | P |
| C | L | T | D | R |
| D | M | V | F | S |
| F | N | W | G | T |
| G | P | X | L | V |
| H | Q | Y | M | X |
| J | R | Z | N | Z |
| " | " | "(Blank) | " | "(Blank) |

What is claimed as new is as follows:

1. A learning aid for the teaching of word formation and letter sounds comprising:

a housing having at least one window therein, ten alphabetical letter indicia bearing colored wheels, certain ones of said wheels having different colors, different vowel indicia, and different consonant indicia and being grouped so that related indicia and colors are located in predetermined positions in said window of said housing in order to facilitate learning of word formation and letter sounds, a support member rotatably mounting said wheels in said housing, bracket means in said housing for removably mounting said support member, and stop means connected to said housing for engaging said wheels and retaining the wheels in a desired rotatable position viewable through said window, each of said wheels including a single group of indicia thereon with the ten wheels including three identical groups each consisting of all the vowels and the schwa, one group of silent consonants, one group of digraphs and consonant letters with sound equivalents of the other consonant letters, three groups each consisting of all the consonants, and two groups each consisting of the most used consonants, whereby movement of said wheels in relation to each other provide a visual indication of various letters and phonetic sound relationship.

2. The structure as defined in claim 1 wherein said housing includes a plurality of parallel openings disposed in mutually spaced relation, each of said wheels having a plurality of peripherally aligned and circumferentially spaced radially extending projections, said projections being disposed between adjacent alphabetical letters, said projections passing through said openings during a portion of the rotatable movement thereof to enable manual rotation of each of said wheels, said stop means including a pair of longitudinal resilient strips disposed adjacent the periphery of said wheels and engaging said projections to releaseably retain the wheels in rotatably adjusted position, said pair of strips being spaced apart to engage the inner surfaces of adjacent projections to align individual alphabetical letters with the window, the support member comprising a rod slotted at opposite ends thereof, the bracket means including guide elements projecting in confronting relation from the housing interior to slidably engage the slotted ends, the guide elements of each bracket means including a raised W-shaped projection having outer arm portions and a central arm portion, the outer arm portion serving to embrace an associated rod end while the central arm portion is slidingly keyed in the slot of the rod end.

3. The structure set forth in claim 1 wherein the support member comprises a rod slotted at opposite ends thereof and wherein the bracket means include guide elements projecting in confronting relation from the housing interior to slidably engage the slotted ends.

4. The structure set forth in claim 3 together with sprockets formed along the wheel periphery for facilitating wheel manipulation, and further wherein the stop means include detent projections for engaging adjacently positioned sprockets.

5. The structure set forth in claim 4 wherein the guide elements of each bracket means include a raised W-shaped projection having outer arm portions and a central arm portion, the outer arm portion serving to embrace an associated rod end while the central arm portion is slidingly keyed in the slot of the rod end.

6. The system of demonstrating the relationship between alphabetic letters and phonetic sounds consisting of the steps of separating the alphabetic letters into ten groups including three identical groups each consisting of all vowels and the schwa, one group of silent consonants, one group of digraphs and consonant letters with sound equivalents of other consonant letters, three groups each consisting of one-third of all consonants, and two groups each consisting of one-half of the most used consonants, distinguishably color coding the groups of letters, placing each of said groups of letters on an independently movable member, aligning alphabetical letters by varying the relative position of the members and the sequential position thereof, and revealing the aligned alphabetical letters through a restricted viewing area whereby movement of members in relation to each other provide for demonstration of various letter relationships and phonetic sound relationship.

* * * * *